United States Patent
Waters

(10) Patent No.: US 9,824,045 B2
(45) Date of Patent: Nov. 21, 2017

(54) USB PORT CONTROLLER WITH AUTOMATIC TRANSMIT RETRIES AND RECEIVE ACKNOWLEDGEMENTS

(71) Applicant: Texas Instruments Incorporated, Dallas, TX (US)

(72) Inventor: Deric Wayne Waters, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 309 days.

(21) Appl. No.: 14/690,806

(22) Filed: Apr. 20, 2015

(65) Prior Publication Data

US 2016/0117274 A1     Apr. 28, 2016

Related U.S. Application Data

(60) Provisional application No. 62/067,619, filed on Oct. 23, 2014.

(51) Int. Cl.
G06F 13/362     (2006.01)
G06F 13/40     (2006.01)
G06F 13/42     (2006.01)
G06F 1/26     (2006.01)

(52) U.S. Cl.
CPC ........... *G06F 13/362* (2013.01); *G06F 1/266* (2013.01); *G06F 13/4068* (2013.01); *G06F 13/4282* (2013.01)

(58) Field of Classification Search
CPC ... G06F 1/266; G06F 13/4286; G06F 13/4282
See application file for complete search history.

(56) References Cited

U.S. PATENT DOCUMENTS

| 6,907,042 | B1* | 6/2005 | Oguchi | H04L 47/30 370/230 |
| 2006/0218415 | A1* | 9/2006 | Mak-Fan | G06F 1/266 713/300 |
| 2008/0162737 | A1* | 7/2008 | Liu | G06F 3/0613 710/8 |
| 2010/0275037 | A1* | 10/2010 | Lee | G06F 13/385 713/189 |

OTHER PUBLICATIONS

"USB Charging Port Controller and Power Switch with Load Detection", Texas Instruments, TPS2546, SLVSbJ2A, Feb. 2013, Revised Feb. 2013, 40 pgs.

(Continued)

*Primary Examiner* — Farley Abad
(74) *Attorney, Agent, or Firm* — John R. Pessetto; Charles A. Brill; Frank D. Cimino

(57) ABSTRACT

Described examples include USB controllers and methods of interfacing a host processor with one or more USB ports with the host processor implementing an upper protocol layer and a policy engine for negotiating USB power delivery parameters, in which the USB controller includes a logic circuit implementing a lower protocol layer to provide automatic outgoing data transmission retries independent of the upper protocol layer of the host processor. The controller logic circuit further implements automatic incoming data packet validity verification and acknowledgment independent of the upper protocol layer of the host processor.

8 Claims, 4 Drawing Sheets

(56) References Cited

OTHER PUBLICATIONS

"Universal Serial Bus Power Delivery Specification", Revision 2.0, V1.0, Aug. 11, 2014, Section 2—Overview, cover sheet and pp. 41-56.
"Universal Serial Bus Power Delivery Specification", Revision 2.0, V1.0, Aug. 11, 2014, Section 5—Physical Layer, pp. 102-140.
"Universal Serial Bus Power Delivery Specification", Revision 2.0, V1.0, Aug. 11, 2014, Section 6—Protocol Layer, pp. 141-207.
"Universal Serial Bus Power Delivery Specification", Revision 2.0, V1.0, Aug. 11, 2014, Section 8—Device Policy, Part 1 (pp. 268-350) and Part 2 (pp. 351-450).
"Universal Serial Bus Type-C Cable and Connector Specification", Revision 1.0, Aug. 11, 2014, USB 3.0 Promoter Group, Part 1 (pp. 1-84) and Part 2 (pp. 85-171).

\* cited by examiner

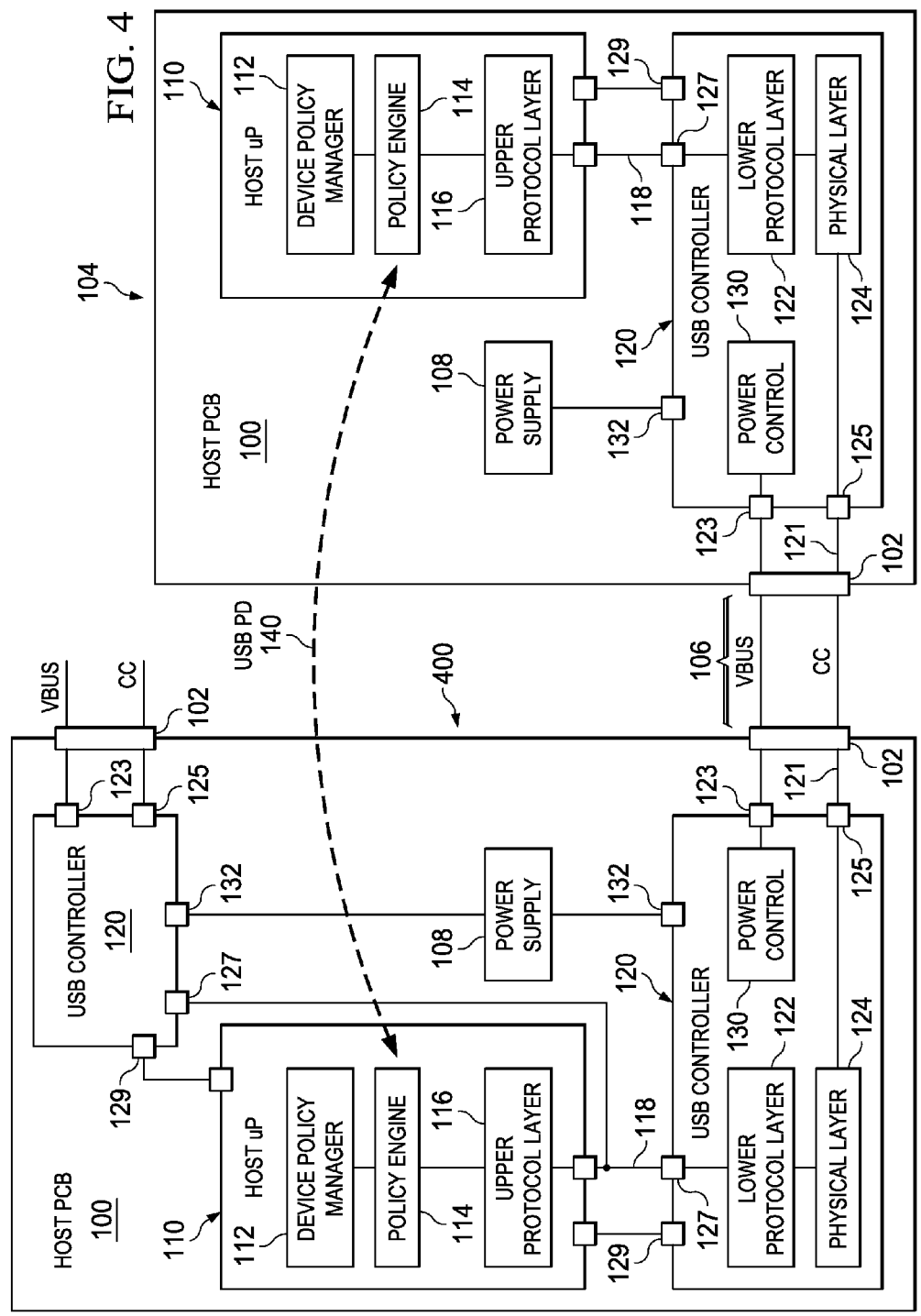

USB PORT CONTROLLER WITH AUTOMATIC TRANSMIT RETRIES AND RECEIVE ACKNOWLEDGEMENTS

The present application claims priority to and the benefit of U.S. Provisional Patent Application Ser. No. 62/067,619, filed Oct. 23, 2014 and entitled USB POWER DELIVERY ANALOG FRONTEND WITH AUTOMATIC RETRIES, the entirety of which is hereby incorporated by reference.

TECHNICAL FIELD

This disclosure relates generally to Universal Serial Bus (USB) interface circuitry and more specifically to USB controllers to interface a host processor with one or more USB ports.

BACKGROUND

USB ports are found in many electronic host devices, such as desktop computers, automobile dashboard consoles and in battery-powered portable devices such as laptop computers, tablets, mobile phones, e-readers and MP3 players. USB compatible systems typically include interface chips mounted to an internal circuit board to interface USB data and power connections to host system circuitry such as power circuits and host processors. USB ports are accessed using standardized USB cable connections to provide serial communications between devices, as well as electrical power transfer for charging and operating battery-powered peripheral devices. Dedicated charging devices are also available having multiple USB ports for charging various portable devices, which may include circuitry for fast charging certain peripheral devices, and many desktop and laptop computers include multiple USB ports for data transfer and/or peripheral device charging.

USB power delivery (USB-PD) and Type-C specifications describe delivery of higher power over USB cables and connectors to provide a universal power plug for devices that may accommodate more than 5 V charging power, and the USB-PD specification defines communications for negotiating voltage and current levels for power transfer from a source port to a sink port, where the power negotiation communications is independent from the normal USB communications. The USB port controller for USB-PD systems typically includes a physical layer as well as overlying protocol and policy engine layers for managing the USB-PD messaging. The physical layer implements Biphase Mark Coding (BMC) for message exchange over a configuration channel (CC) wire or line of the USB cable. Systems having multiple USB ports, however, require a separate USB port controller for each port, with each conventional port controller implementing the physical, protocol and policy engine layers.

SUMMARY

In described examples, port controllers include logic circuitry to implement USB-PD physical layer and lower protocol layer message processing, for interfacing multiple USB ports with a host processor that implements the upper protocol layer as well as a policy engine and device policy manager layer for improved multi-port USB systems. In at least one example, the port controller automatically retransmits outgoing packets to a USB PD communication line of an associated USB connector independent of the upper protocol layer in the host if no timely acknowledgment has been received. In certain examples, the port controller automatically sends acknowledgment of valid incoming packets from the USB port independent of the host.

Described multi-port USB systems include port controllers individually associated with corresponding USB port connectors, and a host processor that implements an upper protocol layer and a policy engine for individually negotiating USB power delivery with one or more associated USB compatible devices connected to corresponding port connectors. The individual USB port controllers include a communication circuit to exchange control and data messages between the USB controller and the host processor, and a logic circuit operable to implement a lower protocol layer for interfacing a port controller transceiver with the upper protocol layer of the host processor. The port controller logic circuit in some examples implements automatic retransmission of outgoing packets to a corresponding USB connector PD communications line independent of the upper protocol layer in the host if no acknowledgment of the outgoing packet is timely received. In at least one example, the individual port controllers automatically send acknowledgment of valid incoming packets independent of the host.

In described examples, a method of interfacing a host processor with a USB port using a USB controller includes transmitting an outgoing packet including data from an upper protocol layer of the host processor, and automatically retransmitting the outgoing packet independent of the host processor if no acknowledgment is timely received by the USB controller. In at least one example, the method includes receiving an incoming packet from a USB connector and automatically sending an acknowledgment indicating receipt of the incoming packet to the USB connector independent of the host processor if the incoming packet is valid.

BRIEF DESCRIPTION OF THE DRAWINGS

FIG. 4 is a schematic diagram of a USB power delivery host system.

DETAILED DESCRIPTION

Figure 1:
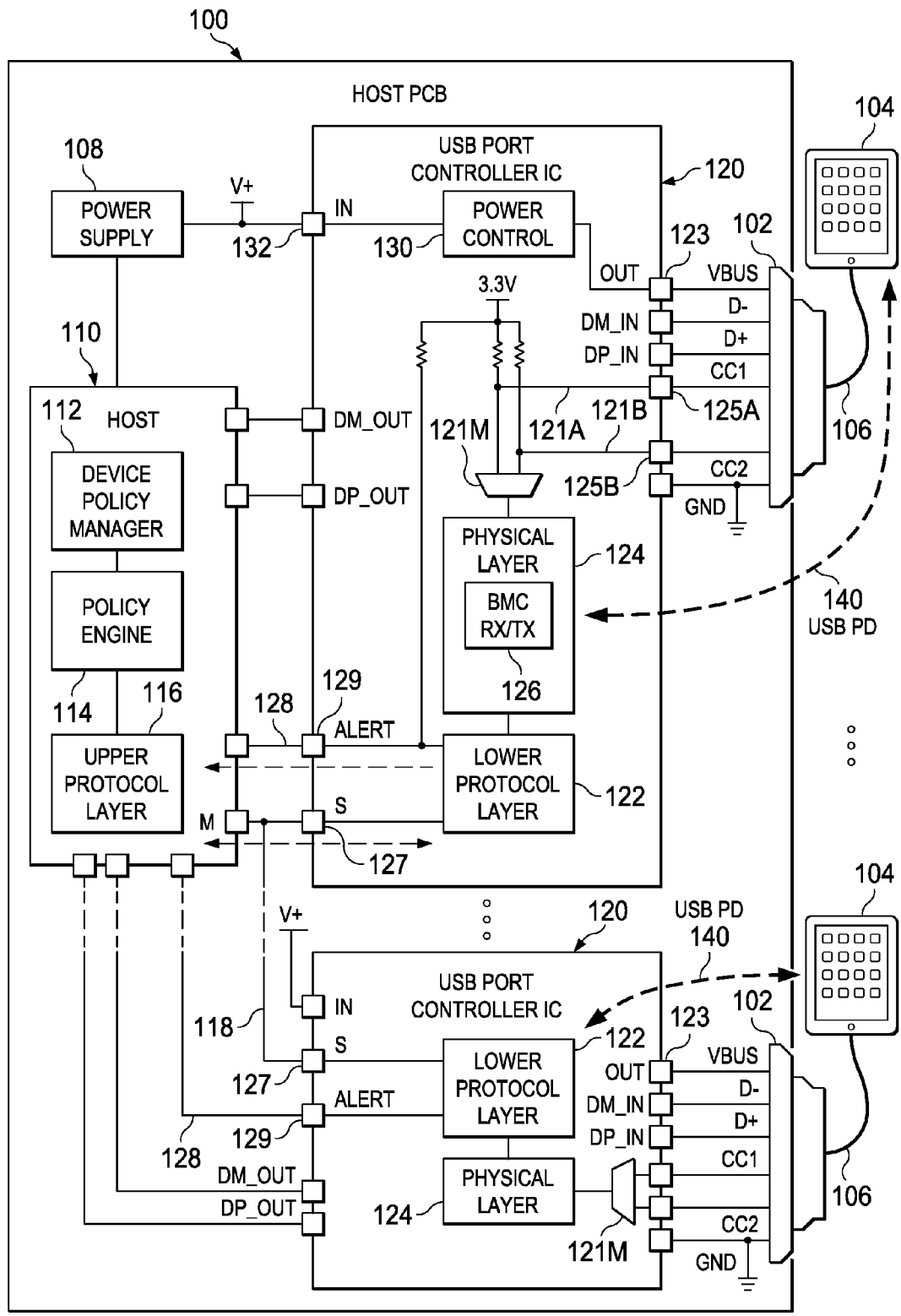
FIG. 1 is a schematic diagram of a host printed circuit board with a host processor and multiple USB port controller integrated circuits interfacing with USB compatible devices.

In the drawings, like reference numerals refer to like elements throughout, and the various features are not necessarily drawn to scale. FIG. 1 shows a host printed circuit board (PCB) 100 including various circuitry implementing a multi-port USB power delivery (USB-PD) system for controlling power transfer between the host PCB 100 and one or more associated USB compatible devices 104. The host PCB 100 includes a plurality of USB port connectors 102 individually associated with a corresponding USB port, a power supply 108, and a host processor 110. The host processor 110 includes (e.g., implements) a device policy manager component 112, a policy engine component 114 and an upper protocol layer component 116. In at least one example, the host processor 110 is a programmable or programmed processor operable when powered to execute instructions stored in an associated electronic memory (not shown) in order to implement the device policy manager 112, the policy engine 114 and the upper protocol layer 116 for individually negotiating USB power delivery parameters with one or more associated USB compatible devices 104 connected to corresponding port connectors 102 via a USB cables 106. In other examples, the host 110 can be any suitable processor, logic circuit, or combination thereof, whether implemented as a single circuit (e.g., integrated circuit or IC) or as multiple circuits. In the illustrated example, a single host processor 110 implements the device policy manager 112, the policy engine 114 and the upper protocol layer 116 for power delivery management in combination with multiple USB port controller ICs 120. Also, the implementation of the upper protocol layer 116 and the policy engine 114 by the host processor 110 advantageously reduces redundancy for multi-port USB systems, in contrast to conventional approaches in which each USB port controller implemented a protocol layer and a policy engine for USB power delivery message processing. In certain examples, the upper protocol layer 116 and the policy engine 114 can be implemented as state machines in the host processor 110, for example, through execution of corresponding programming code by the processor 110.

The host processor 110 provides power delivery messaging functionality for negotiating power delivery operating parameters with the connected USB compatible devices 104 through a communications bus 118 for exchanging control and data messages between the USB controllers 120 and the host processor 110. In at least one example, the individual USB controllers 120 and the host processor 110 implement an Inter-Integrated Circuit (I²C) serial communications bus 118. The port controllers 120 individually include a host communications circuit with at least one connection pin or terminal 127 operable to selectively exchange control and data messages between the USB controller 120 and the host processor 110 via the communications bus 118, which is a single conductive trace on the host PCB 100 connecting corresponding terminals or pins of the host processor 110 and the port controller ICs 120. One I2C example uses three wires for an ALERT line, a serial clock line SCL and a serial data line SDA. In one example, the host processor 110 operates as a communications bus master via a communications connection terminal or pin M, and each of the port controller ICs 120 has a corresponding slave terminal S 127. In operation, the host processor 110 reads and writes data from/to internal registers of the individual USB port controller ICs 120 in order to exchange control commands and data including receive and transmit packet data and transmit control messaging. In the illustrated example, the individual USB controllers 120 includes a serial communications connection 127 for transferring the control and data messages between the USB controller 120 and the host processor 110, and the serial communications connections 127 of the USB controllers 120 are connected to one another to share a single serial communications channel 118 with the host processor 110 In the most common embodiment there would be two wires used for the I²C communications (not counting ALERT) one for the clock usually called SCL and one for the data usually called SDA. Also, the port controllers 120 include an output connection terminal or pin 129 (ALERT) operative to provide a signal on a corresponding alert line 128, which may be pulled up to a positive voltage node (e.g., 3.3 V) via a corresponding pull-up resistor internal to the USB port controller IC 120. Assertion of the alert signal at the connection terminal 129 in one example selectively alerts the host processor 110 to read data from the USB controller 120, for example, to retrieve incoming packets received from the corresponding USB port.

The port controllers 120 in this example include a logic circuit 122 operable to implement a lower protocol layer for power delivery messaging, as well as a physical layer circuit 124 for interfacing a transceiver circuit 126 for interfacing a USB configuration channel (CC) line 121 of the USB connectors 102. The connector 106 in one example provides two CC pins 125 including a CC1 pin 125A and a CC2 pin 125B for connecting signals on CC1 and CC2 lines 121A and 121B, respectively. A multiplexer 121M couples one of the lines 121A or 121B with the physical layer 124 and the port controller 120 provides logic (not shown) to determine which pin to multiplex through to the physical layer 124. The CC1 and CC2 lines 121A and 121B are pulled up to 3.3V through corresponding resistors in one example. In other examples current sources or resistive pull-downs to ground are used. In one example, CC1 and CC2 pins are provided in a Type-C receptacle, and one of the lines CC1 and CC2 is passed through the cable 106 and is referred to as CC. In this example, the pins on the host system side are referred to as CC1 and CC2, and on the cable 106 the corresponding pins are called CC and VCONN. The plug can be inserted in one of two rotated positions so that either a CC1-CC, CC2-VCONN connection or a CC2-CC, CC1-VCONN connection are possible, where VCONN may or may not pass all the way through the cable 106.

The logic circuit 122 implementing the lower protocol layer in one example is a logic circuit implementing a state machine to provide the lower protocol layer functionality as detailed herein and other protocol layer functions. In other examples, a programmed or programmable processor circuit may be included in the port controller integrated circuit 120 in order to implement the lower protocol layer 122. In the illustrated example, the USB port controller IC 120 includes a pull-up resistor connected between the CC input terminal 125 and a positive voltage (e.g., 3.3 V). In one example, the physical layer transceiver 126 is operatively connected to the CC line 121 via a controller IC terminal or pad 125 and the host PCB 100 includes a conductive trace for connection to the corresponding terminal of the USB connector 102. The transceiver 126 in this example implements Biphase Mark Coding for exchanging packets with an associated USB compatible device 104 over the CC wire of the USB connector 102 and cable 106. The USB connector 102 also includes one or more standard USB data lines with corresponding connections to USB data terminals of the USB port controller IC 120, including plus and minus data lines D+ and D– connected to corresponding terminals labeled DPIN and DM_IN of the port controller 120. The USB port controllers 120 also provide host-side data connection terminals DP_OUT and DM_OUT for selectively transferring the USB data line signals to the host processor 110. The transceiver 126 operates to selectively transfer data between the USB controller 120 and the associated USB compatible device 104 through the communications line CC of the corresponding USB connector 102. In other examples, the data lines D+ and D– do not enter into the port controller IC 120.

The multi-port USB system including the host processor 110 and the USB port controller ICs 120 implement USB power delivery (USB PD) communications 140 for negotiating power delivery parameters such as charging voltage and current levels and other functions, with the host processor 110 implementing the device policy manager 112 as well as the policy engine and the upper protocol layer components 114 and 116, while the port controllers 120 implement the lower protocol layer 122 and the physical layer 124. The example of FIG. 1 is in contrast to conventional multiport USB systems in which individual port controllers each implemented a policy engine and a protocol layer. Accordingly, the described examples facilitate reduction of redundancy in multiport USB systems, as well as low-cost USB port controller ICs 120 with reduced complexity compared with conventional USB-PD port controller devices.

Two USB ports are shown in the example of FIG. 1. In other examples, any integer number of ports can be provided including corresponding USB connectors 102 and associated USB port controllers 120. The individual USB controllers 120 are operable for interfacing the host processor 110 with a corresponding USB compatible device 104 connected to the corresponding USB port connector 102. The port controller ICs 120 in this example also implement power delivery management for operation as a USB source or a USB sink with respect to power exchange with the associated USB device 104. Each port controller IC 120 in this example includes a power control circuit 130 having an input connected by an input terminal IN 132 to the host PCB power supply 108, and an output connected by a terminal OUT 123 to a power line VBUS of the USB connector 102. The output terminal 123 provides a USB power connection operable to selectively transfer power between the USB controller 120 and the associated USB compatible device 104 through the USB connector 102 and the cable 106. In operation of the host PCB 100 as a USB source to power and/or charge the connected USB compatible device 104, the power control circuitry 130 receives power at a supply voltage V+ from the power supply 108 and includes a switching circuit for controlling charging current supplied to the first power terminal 124. The power supply 108 and/or the power control circuit 130 in some examples is configurable to provide a selected voltage to the VBUS line, for example, 5 V or a higher voltage for fast charging, at a controlled charging current level based on power delivery parameters negotiated via the USB PD communications 140.

In one example, the host processor 110 controls operating levels of the power supply 108 (e.g., voltage output level V+ and/or output current level) directly or indirectly according to power delivery conditions negotiated with one or more connected USB compatible devices 104. The controlled charging levels, moreover, can be particularized by the host processor 110 on a port-by-port basis. In some examples, the host processor 110 provides control or command messaging to individual USB port controllers 120 in order to set the operating conditions of the port controller power control circuit 130 based on the negotiated power delivery parameters for the corresponding associated USB compatible device 104 on a port-by-port basis. For example, the power control circuitry 130 of two different USB port controller ICs 120 can be configured by the host processor 110 to deliver power to the corresponding bus voltage lines of the USB ports 102 at different current levels, for instance, to fast charge one connected USB device 104 at a higher current than a different USB device 104 connected to another USB port. In operation, the charging port controller IC 120 selectively operates the power control circuit 130 to regulate charging or operating current provided to the USB device 104 from the power supply 108 through the VBUS line at a positive bus voltage with respect to the USB connector ground line GND. The USB power delivery parameter negotiation and operation for the individual ports is implemented via the device policy manager component 112 executed by the host processor 110 in conjunction with the policy engine component 114.

The policy engine 114 and device policy manager 112 determine appropriate settings for the port controllers 120 and power supply 108 to accommodate a variety of different power delivery scenarios in which the individual port controllers 120 can operate as a power delivery source or a power delivery sink, and the corresponding associated USB compatible devices 104 can provide power to the VBUS line or receive power therefrom. When the connected USB device 104 receives power from the associated port controller IC 120, moreover, this received power can be used for operating the device 104 and/or for charging an internal battery thereof (not shown). The USB PD messaging exchange 140 is used by the device policy manager 112 and the policy engine 114 to negotiate appropriate voltage and current levels for such power exchange. In addition, the policy engine 114 can also make appropriate updates to the power delivery conditions of each individual port controller 120, for example, by discontinuing elevated voltage provision upon detection that a corresponding USB compatible device 104 has been disconnected from the corresponding USB connector 102 for a given port. The policy engine 114 in certain examples controls the operating level of the power supply 108 as well as the operation of the individual power control circuits 130 of the port controller ICs 120.

FIG. 4 shows a USB host system 400 including a multiport host PCB 100 as also shown in, FIG. 1, as well as a host PCB 100 of a connected USB compatible device 104. A corresponding policy engine 114 in the host processor 110 of the connected USB device 104 controls operation of the load of the USB device 104 according to the negotiated power delivery operating parameters and conditions. As shown in FIG. 4, the connected USB compatible device 104 also implements a device policy manager 112, policy engine 114 and upper protocol layer 116 in a corresponding host processor 110, and includes a USB controller IC 120 having a power control circuit 130, a physical layer circuit 124 and a lower protocol layer logic circuit 122 as described above. In addition, the USB compatible device 104 may include a power supply 108, which may comprise a battery in some examples. Power delivery messaging 140 may also be used in certain examples for non-power related features. For example, the messaging 140 may be used for negotiating display port operation for video data presentation, or for negotiating port pin definitions with respect to operation of certain lines of the USB cable 106.

Figure 2:
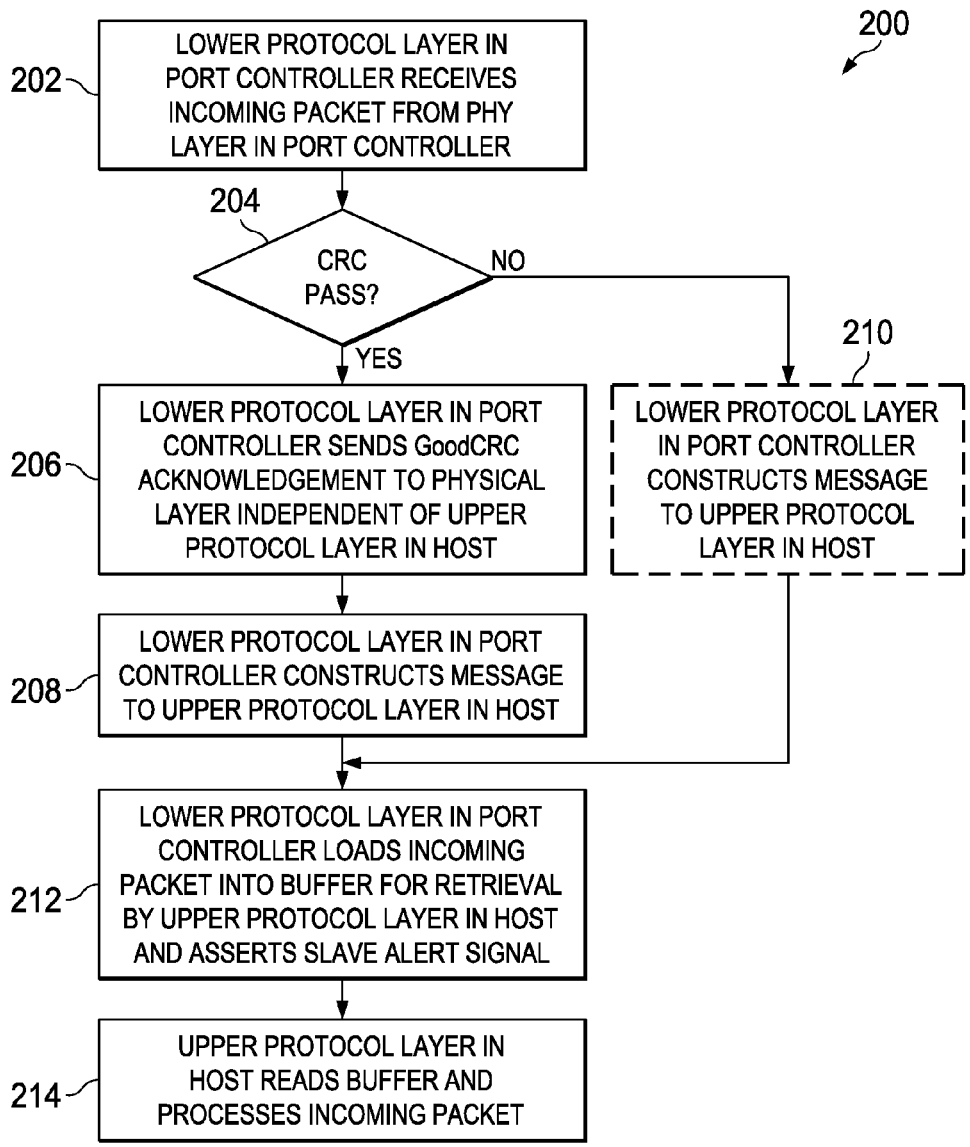
FIG. 2 is a flow diagram showing receive processing in the USB port controller IC.

FIG. 2 illustrates a process or method 200 of interfacing a host processor 110 with a USB port using a USB controller 120 involving receive operation during power delivery messaging 140. The receive operation 200 is used where a connected USB compatible device 104 wishes to send incoming packet data through the USB cable 106 to the policy engine 114 of the host processor 110. At 202 in FIG. 2, the lower protocol layer 122 in the port controller 120 receives incoming packet data from the physical layer 124 via the transceiver 126 (FIG. 1). At 204, the lower protocol layer logic circuit 122 performs a cyclic redundancy code (CRC) check of the incoming packet independent of operation of the host processor 110 to ascertain whether the incoming packet is valid. If so (YES at 204), the lower protocol layer 122 in the port controller 120 automatically sends an acknowledgment at 206 (e.g., a GoodCRC message) to the CC communications line via the physical layer transducer 126 to indicate receipt of the incoming packet. Because the automatic acknowledgment at 206 is independent of the upper protocol layer 116 of the host processor 110, the acknowledgement processing is not subject to communication delays on the I$^2$C bus 118.

At 208, the lower protocol layer 122 of the port controller 120 constructs a message for transmission through the serial communications bus 118 to the upper protocol layer 116 in the host processor 110 with the received valid message. At this point the host processor 110 in some examples takes action with respect to a received packet from the connected USB compatible device 104. In one example, the lower protocol layer 122 stores a GoodCrcCompleteSop message in an internal register at 212 in FIG. 2, and asserts the ALERT signal via the terminal 129 to provide a corresponding signal on the line 128. In response, the upper protocol layer 116 in the host processor 110 performs a read operation at 214 using the communications bus 118 to obtain the message prepared by the port controller 120. In one implementation, the message indicates that the received packet had a valid CRC test result, with a body of the message including the received packet. In one example, if the CRC does not pass, the power controller does not alert the host that a message has arrived. It is treated as if no message arrived, and the step 210 is omitted. In another embodiment different messages (eg. GoodCrcCompleteSop and GoodCrcCompleteNonSop) are provided to indicate the type of message that has been received. In some implementations, there may just be a single alert GoodCrcComplete, instead of a GoodCrcCompleteSop and a GoodCrcCompleteNonSop message. In the example of FIG. 2, if the CRC test fails (NO at 204), the lower protocol layer 122 of the port controller 120 constructs a message (InvalidMessageReceived) at 210 for transmission to the host processor 110 via the serial communications bus 118, and loads the message into the lower protocol layer register at 212. The host processor 110 may read the stored message at 214 and can selectively ignore the received packet or take other suitable action.

The automatic CRC check at 204 and the automatic provision of the acknowledgment at 206 by the lower protocol layer 122 in the USB port controller 120 do not involve actions by the host processor 110. Because of this, any timing constraints in the communications protocol between the connected USB compatible device 104 and the host PCB 100 do not involve latency associated with the I²C serial communications along the bus 118 between the port controller 120 and the host processor 110. In this manner, a relatively low speed communications bus 118 can be provided between the host processor 110 and the USB port controllers 120, with the USB port controller ICs 120 accommodating any time sensitive acknowledgment of received incoming packets automatically. The port controller ICs 120 facilitate offloading of the policy engine and upper protocol layer functions 114 and 116 into the host processor 110 while still implementing timely CRC check and automatic incoming packet acknowledgment at 204 and 206 in FIG. 2. Moreover, the implementation of the upper protocol layer 116 and the policy engine 114 in the host processor 110 removes redundancy from a multi-port system having two or more USB port controllers 120. In this manner, the cost and complexity of the USB port controllers 120 can be reduced, and the host processor 110 implements the policy engine and upper protocol layer features 114 and 116, while using a shared communications channel 118 for communication between the host processor 110 and the USB port controllers 120.

Figure 3:
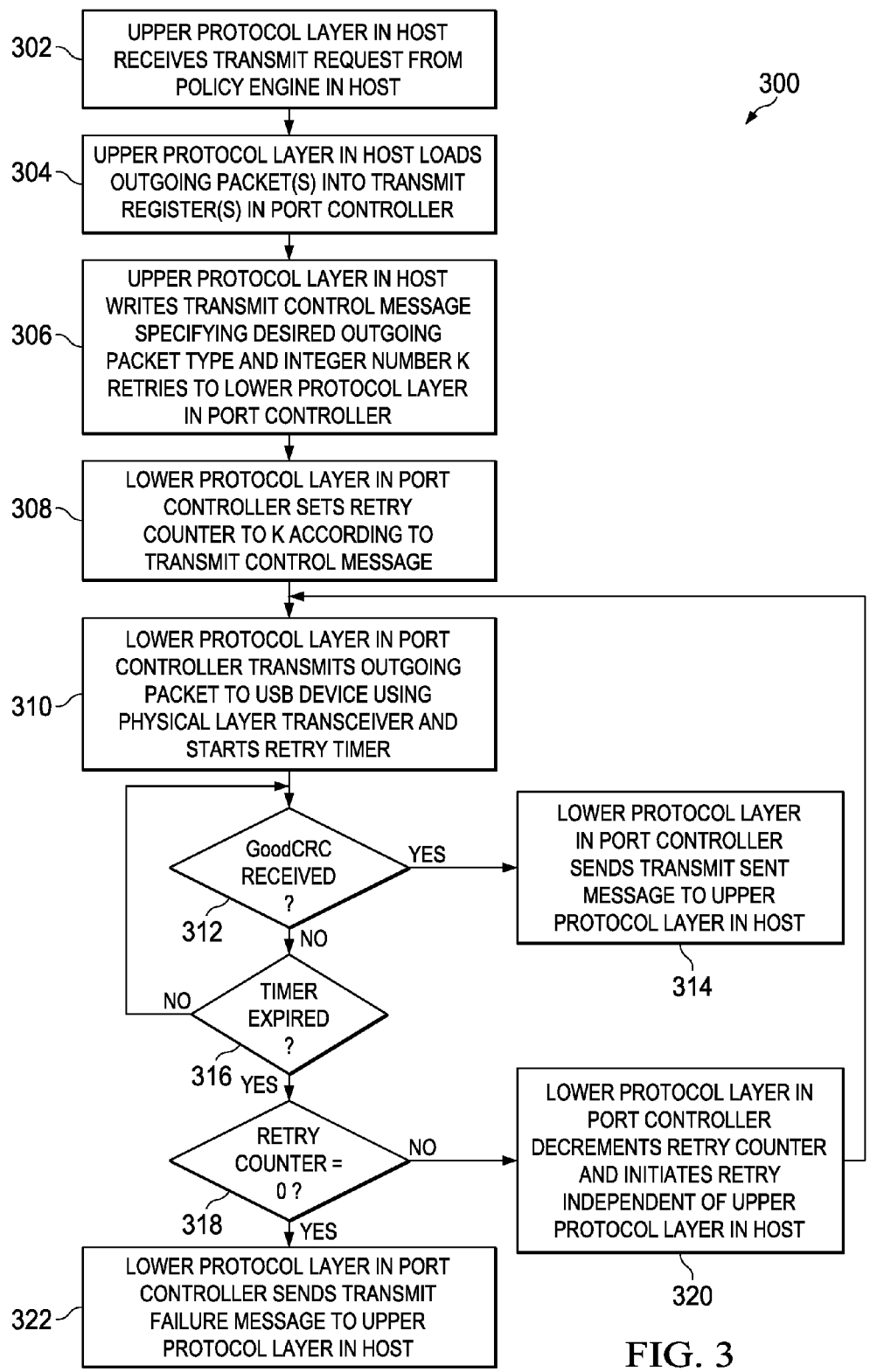
FIG. 3 is a flow diagram showing transmit processing in the USB port controller IC.

FIG. 3 illustrates an example of transmit processing 300 as part of the USB power delivery messaging 140 in which the lower protocol layer 122 of the USB port controller IC 120 automatically performs selective retransmission of an outgoing packet to the CC line of the USB connector 102 independent of the upper protocol layer 116. In certain examples, the host 110 can disable the transceiver or modem 126 at any time, causing the transmit processing 200 in FIG. 2 to be aborted. Also, if a message is received, for example when the CRC test passes (YES) at 204 in FIG. 2, then the port controller 120 sends transmit failure or transmit discarded message to the host 110 if it was in the process of sending a message in FIG. 3. The transmit process 300 begins at 302 with the upper protocol layer 116 of the host processor 110 receiving a transmit request from the policy engine 114 to transmit a message to a USB compatible device 104 associated with a corresponding one of the USB port controllers 120. At 304, the upper protocol layer 116 performs a write operation via the I²C bus 118 to load outgoing packet data corresponding to one or more desired outgoing packets into a transmit register of a select one of the USB port controllers 120. At 306, the upper protocol layer 116 writes a transmit control message to the selected USB port controller 120, for example, by performing a write operation to a register internal to the USB port controller 120. The transmit control message in one example specifies a desired outgoing packet type and an integer number "K" retries for transmitting the outgoing packet data, where K is greater than or equal to one. At 308, the lower protocol layer 122 of the port controller 120 sets a retry counter to the integer number K according to the transmit control message received from the upper protocol layer 116. In other examples, the lower protocol layer 122 can set or control the number of transmit retries independent of the most recent transmit control message from the upper protocol layer 116 in the host processor 110. The lower protocol layer 122 constructs and transmits the outgoing packet at 310 according to the desired outgoing packet type specified in the transmit control message.

The lower protocol layer 122 of the USB port controller 120 thereafter advantageously implements autonomous retries for transmitted packets which are not acknowledged in a timely fashion. Although some described examples perform a number of retries (as needed) according to an integer retry value K provided by the host processor 110 in a transmit control message, the actual retransmission or retry attempts are performed without further action by the host processor 110 or the upper protocol layer 116 thereof. This autonomous retransmission or retry processing is referred to as being independent of the upper protocol layer 116 and independent of the host processor 110 even though a maximum number of retry attempts may be controlled by a previously provided integer retry value K sent by the host processor 110 in the transmit control message. The retry processing at 312, 316, 318 and 320, in this regard, is independent of (i.e., requires no intervening acts by) the host processor 110 and the upper protocol layer 116 thereof. In this manner, the timing constraints of a given communications protocol are not hampered by potential latency in the serial communications of the bus 18 between the USB port controller 120 and the host processor 110. The lower protocol layer 122 in the port controller 120 independently manages and implements selective retry or retransmission processing for outgoing packets sent to the connected USB compatible device 104. In one example, the lower protocol layer 122 makes a determination at 312 as to whether an acknowledgment of receipt of the outgoing packet by the associated USB compatible device 104 has been received, such as a "GoodCRC" message. If so (YES at 312), the lower protocol layer 122 of the port controller 120 sends a message (e.g., a "transmit sent" message) to the upper protocol layer 116 of the host processor 110 indicating that the outgoing packet was successfully transmitted, and the policy engine 114 can proceed with transmission of other outgoing packets if desired.

If no acknowledgment has been received (NO at 312), a determination is made at 316 by the lower protocol layer 122 as to whether a timer has expired. Any suitable timer value can be used, which in practice can be tailored to a specific protocol for USB power delivery communications along the CC line 121, for example, representing the time the attached device 104 is required to issue a GoodCRC message upon receiving the transmitted packet. If the timer has not yet expired (NO at 316), the lower protocol layer 122 continues to check for receipt acknowledgment at 312. Once the timer expires without receipt of a timely acknowledgment (YES at 316), the lower protocol layer 122 determines at 318 whether the previously set retry counter has reached zero. If not (NO at 318), the lower protocol layer 122 automatically initiates retransmission of the outgoing packet at least once via the communications line CC and decrements the retry counter at 320 and 310 independent of the upper protocol layer 116.

In this manner, the host processor 110 is not involved in the selective retransmission, which is instead managed by the lower protocol layer 122 in the USB port controller IC 120. This example removes any latency of the serial communications bus 118 from the retry processing, which may have time constraints. This processing 310, 312, 316, 318 and 320 may be repeated, depending on the initial retry counter value K and the success or failure in receiving a timely acknowledgment from the USB compatible recipient device 104 connected to the associated port. If the designated number K retries have been attempted without success (YES at 318), the lower protocol layer 122 of the port controller 120 sends a transmit failure message to the upper protocol layer 116 of the host processor 110 via the serial communications bus 118. In one example, this includes the lower protocol layer 122 constructing and loading an internal register with a transmit failure message, and asserting the ALERT line 128 to tell the upper protocol layer 116 in the host processor 110 to read the loaded register and thereby obtain the message. The upper protocol layer 116 thereafter provides the message to the policy engine 114 for further processing.

Modifications are possible in the described embodiments, and other embodiments are possible, within the scope of the claims.

What is claimed is:

1. A universal serial bus (USB) controller for interfacing a host processor with a USB port, the USB controller comprising:
   a USB power connection operable to selectively transfer power between the USB controller and an associated USB compatible device through a USB connector;
   a transceiver operable to selectively transfer data between the USB controller and the via the associated USB compatible device through at least one USB communications line of the USB connector;
   a host communications circuit operable to selectively exchange control and data messages between the USB controller and the host processor; and
   a logic circuit operable to implement a lower protocol layer for interfacing the transceiver with an upper protocol layer of the host processor via the host communications circuit, the logic circuit operable to:
      receive outgoing packet data from the upper protocol layer of the host processor for transmission to the associated USB compatible device;
      transmit an outgoing packet, including the outgoing packet data from the upper protocol layer to the USB communications line of the USB connector via the transceiver; and
      automatically retransmit the outgoing packet at least once independent of the upper protocol layer, if no acknowledgement of receipt of the outgoing packet by the associated USB compatible device is timely received by the transceiver;
   wherein the logic circuit is operable to:
   receive an incoming packet from the associated USB compatible device via the transceiver; and
   automatically send an acknowledgment to the USB communications line indicating receipt of the incoming packet independent of the upper protocol layer, if the incoming packet is valid;
   wherein the logic circuit is operable to send the incoming packet to the upper protocol layer via the host communications circuit after sending the acknowledgment if the incoming packet is valid;
   wherein the logic circuit is operable to:
   receive a transmit control message from the upper protocol layer, the transmit control message specifying a desired outgoing packet type and an integer number K retries for transmitting the outgoing packet data;
   construct and transmit the outgoing packet according to the desired outgoing packet type specified in the transmit control message;
   selectively automatically retransmit the outgoing packet up to K times independent of the upper protocol layer, if no acknowledgment of receipt of the outgoing packet by the associated USB compatible device is timely received by the transceiver; and
   send a transmit failure message to the upper protocol layer if no acknowledgement of receipt of the outgoing packet by the associated USB compatible device is timely received by the transceiver after K retries.

2. A universal serial bus (USB) controller for interfacing a host processor with a USB port, the USB controller comprising:
   a USB power connection operable to selectively transfer power between the USB controller and an associated USB compatible device through a USB connector;
   a transceiver operable to selectively transfer data between the USB controller and the via the associated USB compatible device through at least one USB communications line of the USB connector;
   a host communications circuit operable to selectively exchange control and data messages between the USB controller and the host processor; and
   a logic circuit operable to implement a lower protocol layer for interfacing the transceiver with an upper protocol layer of the host processor via the host communications circuit, the logic circuit operable to:
      receive outgoing packet data from the upper protocol layer of the host processor for transmission to the associated USB compatible device;
      transmit an outgoing packet, including the outgoing packet data from the upper protocol layer to the USB communications line of the USB connector via the transceiver; and
   automatically retransmit the outgoing packet at least once independent of the upper protocol layer, if no acknowledgement of receipt of the outgoing packet by the associated USB compatible device is timely received by the transceiver;
   wherein the logic circuit is operable to:

receive a transmit control message from the upper protocol layer, the transmit control message specifying a desired outgoing packet type and an integer number K retries for transmitting the outgoing packet data;

construct and transmit the outgoing packet according to the desired outgoing packet type specified in the transmit control message;

selectively automatically retransmit the outgoing packet up to K times independent of the upper protocol layer, if no acknowledgment of receipt of the outgoing packet by the associated USB compatible device is timely received by the transceiver; and send a transmit failure message to the upper protocol layer if no acknowledgement of receipt of the outgoing packet by the associated USB compatible device is timely received by the transceiver after K retries.

3. A multi-port universal serial bus (USB) power delivery host system for controlling power transfer between USB compatible devices, comprising:

a plurality of USB port connectors individually associated with a corresponding USB port of the host system;

a host processor operable to implement an upper protocol layer and a policy engine for individually negotiating USB power delivery with one or more associated USB compatible devices connected to corresponding ones of the USB port connectors; and a plurality of USB controllers individually operable for interfacing the host processor with a corresponding USB compatible device connected to the corresponding USB port connector, the individual USB controllers comprising:

a USB power connection operable to selectively transfer power between the USB controller and the associated USB compatible device through the corresponding USB connector;

a transceiver operable to selectively transfer data between the USB controller and the associated USB compatible device through at least one USB communications line of the corresponding USB connector;

a host communications circuit operable to selectively exchange control and data messages between the USB controller and the host processor; and a logic circuit operable to implement a lower protocol layer for interfacing the transceiver with the upper protocol layer of the host processor via the host communications circuit, the logic circuit operable to:

receive outgoing packet data from the upper protocol layer of the host processor for transmission to the associated USB compatible device;

transmit an outgoing packet, including the outgoing packet data from the upper protocol layer to the USB communications line of the corresponding USB connector via the transceiver; and automatically retransmit the outgoing packet at least once independent of the upper protocol layer, if no acknowledgement of receipt of the outgoing packet by the associated USB compatible device is timely received by the transceiver;

wherein the logic circuit of the individual USB controllers is operable to:

receive an incoming packet from the associated USB compatible device via the transceiver; and automatically send an acknowledgment to the USB communications line indicating receipt of the incoming packet independent of the upper protocol layer, if the incoming packet is valid;

wherein the logic circuit of the individual USB controllers is operable to send the incoming packet to the upper protocol layer via the host communications circuit after sending the acknowledgment if the incoming packet is valid;

wherein the logic circuit of the individual USB controllers is operable to:

receive a transmit control message from the upper protocol layer of the host processor, the transmit control message specifying a desired outgoing packet type and an integer number K retries for transmitting the outgoing packet data;

construct and transmit the outgoing packet according to the desired outgoing packet type specified in the transmit control message;

selectively automatically retransmit the outgoing packet up to K times independent of the upper protocol layer, if no acknowledgment of receipt of the outgoing packet by the associated USB compatible device is timely received by the transceiver; and send a transmit failure message to the upper protocol layer if no acknowledgement of receipt of the outgoing packet by the associated USB compatible device is timely received by the transceiver after K retries.

4. A multi-port universal serial bus (USB) power delivery host system for controlling power transfer between USB compatible devices, comprising:

a plurality of USB port connectors individually associated with a corresponding USB port of the host system;

a host processor operable to implement an upper protocol layer and a policy engine for individually negotiating USB power delivery with one or more associated USB compatible devices connected to corresponding ones of the USB port connectors; and a plurality of USB controllers individually operable for interfacing the host processor with a corresponding USB compatible device connected to the corresponding USB port connector, the individual USB controllers comprising:

a USB power connection operable to selectively transfer power between the USB controller and the associated USB compatible device through the corresponding USB connector;

a transceiver operable to selectively transfer data between the USB controller and the associated USB compatible device through at least one USB communications line of the corresponding USB connector;

a host communications circuit operable to selectively exchange control and data messages between the USB controller and the host processor; and a logic circuit operable to implement a lower protocol layer for interfacing the transceiver with the upper protocol layer of the host processor via the host communications circuit, the logic circuit operable to:

receive outgoing packet data from the upper protocol layer of the host processor for transmission to the associated USB compatible device;

transmit an outgoing packet, including the outgoing packet data from the upper protocol layer to the USB communications line of the corresponding USB connector via the transceiver; and automatically retransmit the outgoing packet at least once independent of the upper protocol layer, if no acknowledgement of receipt of the outgoing packet by the associated USB compatible device is timely received by the transceiver;

wherein the logic circuit of the individual USB controllers is operable to:

receive a transmit control message from the upper protocol layer of the host processor, the transmit control message specifying a desired outgoing packet type and an integer number K retries for transmitting the outgoing packet data;

construct and transmit the outgoing packet according to the desired outgoing packet type specified in the transmit control message;

selectively automatically retransmit the outgoing packet up to K times independent of the upper protocol layer, if no acknowledgment of receipt of the outgoing packet by the associated USB compatible device is timely received by the transceiver; and send a transmit failure message to the upper protocol layer if no acknowledgement of receipt of the outgoing packet by the associated USB compatible device is timely received by the transceiver after K retries.

5. A multi-port universal serial bus (USB) power delivery host system for controlling power transfer between USB compatible devices, comprising:

a plurality of USB port connectors individually associated with a corresponding USB port of the host system;

a host processor operable to implement an upper protocol layer and a policy engine for individually negotiating USB power delivery with one or more associated USB compatible devices connected to corresponding ones of the USB port connectors; and a plurality of USB controllers individually operable for interfacing the host processor with a corresponding USB compatible device connected to the corresponding USB port connector, the individual USB controllers comprising:

a USB power connection operable to selectively transfer power between the USB controller and the associated USB compatible device through the corresponding USB connector;

a transceiver operable to selectively transfer data between the USB controller and the associated USB compatible device through at least one USB communications line of the corresponding USB connector;

a host communications circuit operable to selectively exchange control and data messages between the USB controller and the host processor; and a logic circuit operable to implement a lower protocol layer for interfacing the transceiver with the upper protocol layer of the host processor via the host communications circuit, the logic circuit operable to:

receive outgoing packet data from the upper protocol layer of the host processor for transmission to the associated USB compatible device;

transmit an outgoing packet, including the outgoing packet data from the upper protocol layer to the USB communications line of the corresponding USB connector via the transceiver; and automatically retransmit the outgoing packet at least once independent of the upper protocol layer, if no acknowledgement of receipt of the outgoing packet by the associated USB compatible device is timely received by the transceiver;

wherein the host communications circuit of the individual USB controllers includes a serial communications connection for transferring the control and data messages between the USB controller and the host processor; and wherein the serial communications connections of the plurality of USB controllers are connected to one another to share a single serial communications channel with the host processor.

6. The USB power delivery host system of claim 5, wherein the individual USB controllers and the host processor implement an Inter-Integrated Circuit communications bus via the serial communications connections.

7. The USB power delivery host system of claim 5, wherein the individual USB controllers include an alert output connection operative to selectively alert the host processor to read data from the USB controller.

8. A method of interfacing a host processor with a USB port using a USB controller, the method comprising:

receiving, in the USB controller, outgoing packet data from an upper protocol layer of the host processor for transmission to the associated USB compatible device;

transmitting an outgoing packet including the outgoing packet data, from the USB controller to a USB communications line of the USB connector; and if no acknowledgement of receipt of the outgoing packet by the associated USB compatible device is timely received by the USB controller, automatically retransmitting the outgoing packet from the USB controller to a USB communications line of a USB connector at least once independent of the host processor;

receiving, in the USB controller, a transmit control message from the upper protocol layer of the host processor, the transmit control message specifying a desired outgoing packet type and an integer number K retries for transmitting the outgoing packet data;

constructing and transmitting the outgoing packet according to the desired outgoing packet type specified in the transmit control message;

if no acknowledgement of receipt of the outgoing packet by the associated USB compatible device is timely received by the USB controller, selectively automatically retransmitting the outgoing packet up to K times independent of the host processor; and if no acknowledgement of receipt of the outgoing packet by the associated USB compatible device is timely received by the USB controller after K retries, sending a transmit failure message from the USB controller to the host processor.

* * * * *